United States Patent
Eyring et al.

(10) Patent No.: US 9,626,850 B2
(45) Date of Patent: Apr. 18, 2017

(54) HOME AUTOMATION COMMUNICATION SYSTEM

(71) Applicant: Vivint, Inc., Provo, UT (US)

(72) Inventors: Matthew J. Eyring, Provo, UT (US); Jeremy B. Warren, Draper, UT (US); James E. Nye, Alpine, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 14/843,325

(22) Filed: Sep. 2, 2015

(65) Prior Publication Data

US 2017/0061750 A1   Mar. 2, 2017

(51) Int. Cl.
*G08B 13/196* (2006.01)
*G08B 21/02* (2006.01)

(52) U.S. Cl.
CPC . *G08B 13/19645* (2013.01); *G08B 13/19695* (2013.01); *G08B 21/0269* (2013.01)

(58) Field of Classification Search
CPC ............ G08B 13/19678; G08B 3/1016; G08B 13/10; G08B 13/1016; G08B 13/19639; G08B 13/19695; G08B 21/0263; G08B 21/0266; G08B 21/0269; H04W 36/08; H04W 36/0005; H04W 36/06; H04W 36/10; H04N 7/18; H04N 7/186; H04N 9/47

See application file for complete search history.

(56) References Cited

U.S. PATENT DOCUMENTS

| | | | |
|---|---|---|---|
| 7,856,558 B2 | 12/2010 | Martin et al. | |
| 8,694,366 B2 * | 4/2014 | Barnes, Jr. ......... | G06Q 10/1053 |
| | | | 705/14.1 |
| 8,780,201 B1 * | 7/2014 | Scalisi .................. | H04N 7/186 |
| | | | 348/143 |
| 2007/0241901 A1 | 10/2007 | Cage et al. | |
| 2008/0129816 A1 | 6/2008 | Mattila et al. | |
| 2012/0274464 A1 | 11/2012 | Sweeney et al. | |
| 2013/0033363 A1 | 2/2013 | Gabara | |
| 2014/0004828 A1 | 1/2014 | Han et al. | |
| 2014/0129006 A1 | 5/2014 | Chen et al. | |
| 2015/0116109 A1* | 4/2015 | Fadell .................. | G08B 19/005 |
| | | | 340/501 |
| 2015/0145993 A1* | 5/2015 | Scalisi .................. | G08B 25/10 |
| | | | 348/143 |

OTHER PUBLICATIONS

Arcsoft, Wondering who's home? introducing new face recognition alerts, obtained from URL: http://blog.arcsoft.com/index.php/wondering-whos-home-announcing-simplicams-new-face-recognition-alerts/, on Apr. 27, 2015.

(Continued)

*Primary Examiner* — Van Trieu
(74) *Attorney, Agent, or Firm* — Holland & Hart LLP

(57) ABSTRACT

A method for security and/or automation systems, comprising determining a presence of a first occupant in a first room at a predefined location, the first room communicatively coupled to a first electronic device capable of receiving input; receiving a request for communication with the first occupant by a remote computer system; sending a response to the request for communication with the first occupant; and establishing a communications link between the first electronic device and the remote computer system.

20 Claims, 8 Drawing Sheets

(56) References Cited

OTHER PUBLICATIONS

Rigg, Netatmo's Welcome connected camera recognizes who's home, obtained from URL: http://www.engadget.com/2015/01/04/netatmo-welcome-camera/, Jan. 4, 2015.
SteamFeed.com,Smart Home Device Utilizing Facial Recognition Debuts Online, obtained from http://www.steamfeed.com/smart-home-device-utilizing-facial-recognition-debuts-online/, Mar. 11, 2014.

* cited by examiner

HOME AUTOMATION COMMUNICATION SYSTEM

BACKGROUND

The present disclosure relates to security and/or automation systems, and more particularly to an automated communication system.

Security and automation systems are widely deployed to provide various types of communication and functional features such as monitoring, communication, notification, and/or others. These systems may be capable of supporting communication with at least one user through a communication connection or a system management action.

Currently, if a family member (e.g., a parent) not currently located in a home wants to communicate verbally or visually with another family member (e.g., a child) located in the home, the parent has to call the child's cell phone or message the child on a computer system. However, the current communication systems are reliant on the child being in front of a computer or having possession of his cell phone at the time of the call. Thus, a system which provides a method for remote family members to communicate with at-home family members more efficiently would be beneficial.

SUMMARY

Existing home communications systems do not take into account the location of the current occupants, nor do existing systems consider whether or not those present in the home are authorized to be present. In addition, communication devices such as cell phones are not always carried by the user in control of the device. Thus, a method for security and/or automation systems is provided in which a remote user can communicate with a home occupant based on, in part, identification and location. In one embodiment, the method may comprise determining a presence of a first occupant in a first room at a predefined location, where the first room is provided with a means for communicating with the occupants of the room. The method may further comprise a room occupant receiving a request for communication, and an establishment of communication between the requester of communication (i.e., a remote user) and the occupant of the room.

In some embodiments, determining the presence of an occupant comprises determining the occupant's identify and current location. Identification may be achieved by way of the system capturing biometric information of the occupant such as a voice print, fingerprints, a retinal scan, a facial scan, and/or a personal identification number (PIN). In other embodiments, a personal and portable electronic device controlled by the occupant (e.g., a smartphone or smartwatch) may be identified as located within a certain room of the house.

In some embodiments, a determination is made as to whether an occupant is authorized to be located in the house or in a specific room within the house.

Further, in some embodiments, the identities and locations of multiple occupants is determined. The identities and locations of the occupants may be provided to a remote party in a plurality of ways, including a floor plan indication each occupant and the occupant's location, a list of the occupants and each occupant's location, or a visual indication (e.g., video stream or picture chart) of the occupants and their current locations.

In yet still other embodiments, a remote party is made aware if and when occupants of the home move from room to room, and thus is able to contact a specific occupant based on the occupant's current location.

In some embodiments, occupants may key-in their presence and current location by entering their PIN into an input device. In some cases, captured biometric information is compared to the entered PIN to determine whether the occupant is authorized or not.

One aspect of the invention relates to a remote computer system communicating with a specific location-based system (e.g., a home automation system). In this embodiment, the system may select a first occupant located at a predefined location to contact; send a request to a predefined location to communicate with the first occupant; receive an indication of location of the first occupant; and communicate with an apparatus located at the location of the first occupant.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The systems and methods described herein relate generally to providing a means of communication between a remote party and occupants in a building. More specifically, a remote party located outside of the home may wish to communicate with a specific person located within the house. For example, a parent at work may want to check in with a child at home. The system may identify the son and daughter are both in the home and determine in which room both children are located. Thus, the parent can speak directly to each child in the specific room. If one of the children moves to another room, the communication between the parent and the child may move from room to room.

The following description provides examples and is not limiting of the scope, applicability, and/or examples set forth in the claims. For example, embodiments may be directed to the home environment, but the disclosure is not limited solely such a location and may be implemented in any environment including an office, a school, etc. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
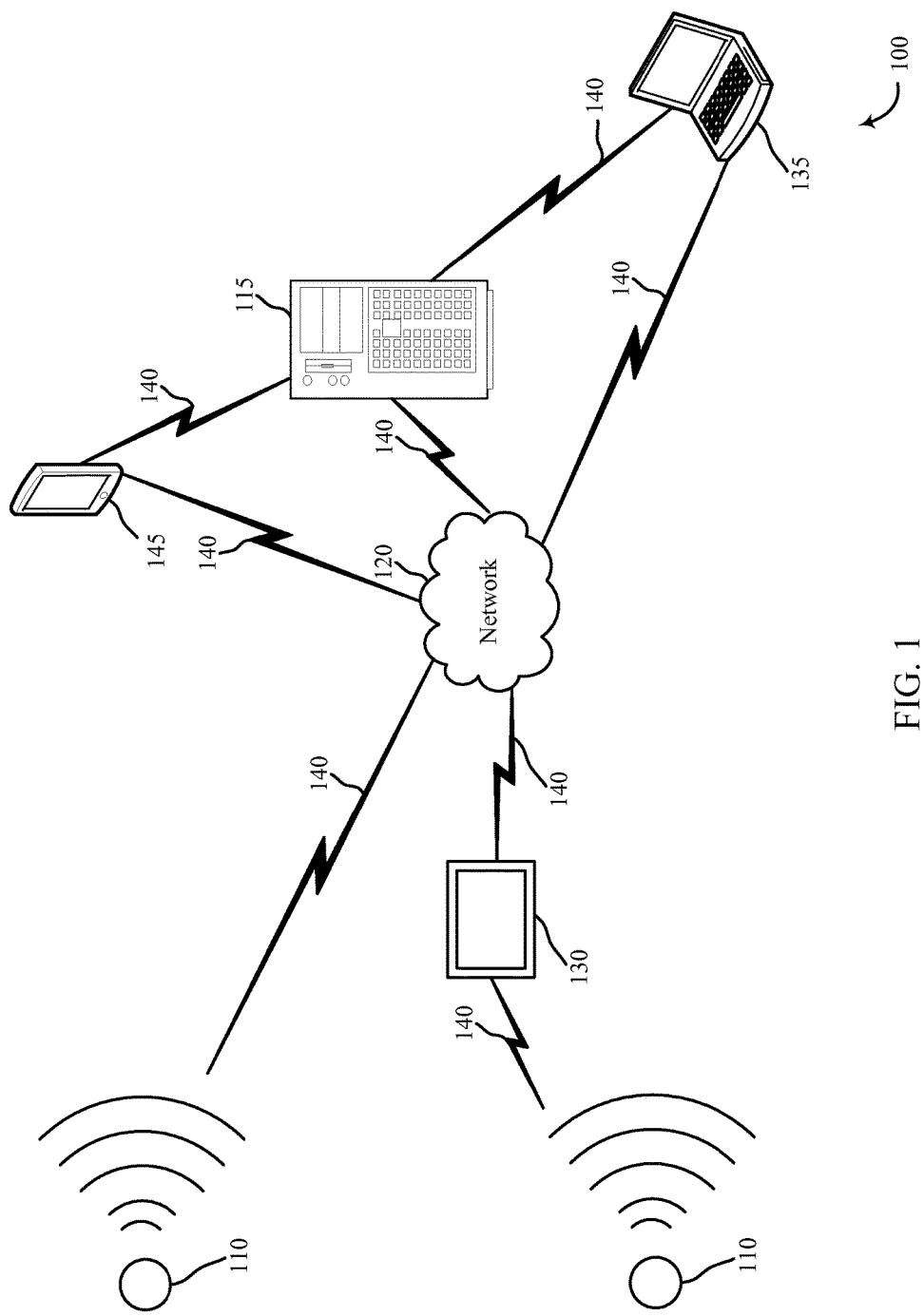
FIG. 1 shows a block diagram relating to a security and/or an automation system, in accordance with various embodiments of this disclosure.

FIG. 1 is an example of a communications system 100 in accordance with various aspects of the disclosure. The communications network may include one or more sensors 110, network 120, server 115, control panel 130, remote computing device 135, and/or local computing device 145. The network 120 may provide user authentication, encryption, access authorization, tracking, Internet Protocol (IP) connectivity, and other access, calculation, modification, and/or functions. The control panel 130 may interface with the network 120 through a first set of wired and/or wireless communication links 140 to communicate with one or more remote servers 115. The control panel 130 may perform communication configuration, adjustment, and/or scheduling for communication with the devices 135 and 145, or may operate under the control of a controller. Control panel 130 may communicate with a back end server (such as the remote server 115)—directly and/or indirectly—using the first set of one or more communication links 140.

The control panel 130 may wirelessly communicate with the devices 135 and 145 by way of one or more antennas. The control panel 130 may provide communication coverage for a respective geographic coverage area 110. In some examples, control panel 130 may be referred to as a control device, a base transceiver station, a radio base station, an access point, a radio transceiver, or some other suitable terminology. The geographic coverage area for a control panel 130 may be divided into sectors making up only a portion of the coverage area. The communications system 100 may include a control panel 130 of different types. There may be overlapping geographic coverage areas 110 for one or more different parameters, including different technologies, features, subscriber preferences, hardware, software, technology, and/or methods. For example, each control panel 130 may be related to one or more discrete structures (e.g., a home, a business) and each of the one more discrete structures may be related to one or more discrete areas. In other examples, multiple control panel 130 may be related to the same one or more discrete structures (e.g., multiple control panels relating to a home and/or a business complex).

The devices 135 and 145 may be dispersed throughout the communications system 100 and each device 135 and 145 may be stationary and/or mobile. Devices 135 and 145 may include a cellular phone, a personal digital assistant (PDA), a wireless modem, a wireless communication device, a wearable electronic device, a handheld device, a tablet computer, a laptop computer, a cordless phone, a wireless local loop (WLL) station, a display device (e.g., TVs, computer monitors, etc.), a printer, a camera, and/or the like. Devices 135 and 145 may also include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. The geographic coverage area for the control panel 130 may be divided into sectors making up only a portion of the coverage area. The communication system, therefore, may comprise more than one control panel 130, where each control panel 130 may provide geographic coverage for a sector of the coverage area. The communication system 100 may include one or more control panels 130 of different types. The control panel 130 may be related to one or more discrete areas. Control panel 130 may be a home automation system control panel or a security control panel, for example, an interactive panel located in a user's home. Control panel 130 may be in direct communication by way of wired or wireless communication links with the one or more sensor units 110. In another embodiment, control panel 130 may receive sensor data from the one or more sensor units 110 by way of computing devices 135, 145, server 115, and network 140.

In one embodiment, the control panel 130 may comprise a speaker, a microphone, and/or a camera. The control panel 130 may operate to broadcast audio and/or video communications from devices 135 and/or 145. In other embodiments, control panel 130 receives input in the form of audio input, video input, biometric data, geographic data (e.g. geotagging, global positioning data), and the like.

The control panel 130 may wirelessly communicate with the sensors 110 via one or more antennas. The sensors 110 may be dispersed throughout the communications system 100 and each sensor 110 may be stationary and/or mobile. A sensor 110 may include and/or be one or more sensors that sense: proximity, motion, temperatures, humidity, sound level, smoke, structural features (e.g., glass breaking, window position, door position), time, amount of light, geolocation data of a user and/or a device, distance, biometrics, weight, speed, height, size, preferences, weather, system performance, vibration, respiration, heartbeat, and/or other inputs that relate to a security and/or an automation system. Devices 135 and 145 and/or a sensor 110 may be able to communicate through one or more wired and/or wireless connections with various components such as control panels, base stations, and/or network equipment (e.g., servers, wireless communication points, etc.) and/or the like.

The communication links 140 shown in communications system 100 may include uplink (UL) transmissions from devices 135 or 145 and/or sensors 110 to a control panel 130, and/or downlink (DL) transmissions, from a control panel 130 to a devices 135 or 145. The downlink transmissions may also be called forward link transmissions while the uplink transmissions may also be called reverse link transmissions. Each communication link 140 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 140 may transmit bidirectional communications and/or unidirectional communications. Communication links 140 may include one or more connections, including but not limited to, 345 MHz, Wi-Fi, BLUETOOTH®, BLUETOOTH® Low Energy, cellular, Z-WAYE®, 802.11, peer-to-peer, LAN, WLAN, Ethernet, fire wire, fiber optic, and/or other connection types related to security and/or automation systems.

In some embodiments control panel 130 and/or devices 135 and 145 may include one or more antennas for employing antenna diversity schemes to improve communication quality and reliability between control panel 130 and devices 135 and 145. Additionally or alternatively, control panel 130 and/or devices 135 and 145 may employ multiple-input, multiple-output (MIMO) techniques that may take advantage of multi-path, mesh-type environments to transmit multiple spatial layers carrying the same or different coded data.

While the devices 135 and/or 145 may communicate with each other through the control panel 130 using communication links 140, each device 135 and/or 145 may also communicate directly with one or more other devices via one or more direct communication links 140. Two or more devices 135 and 145 may communicate via a direct communication link 140 when both devices 135 and 145 are in the geographic coverage area or when one or neither of devices 135 or 145 is within the geographic coverage area. Examples of direct communication links 140 may include Wi-Fi Direct, BLUETOOTH®, wired, and/or, and other P2P group connections. The devices 135 and 145 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within communications system 100.

In one example embodiment, the devices 135 and 145 may be a local computing device and a remote computing device, respectively. Local computing device 145 may be a custom computing entity configured to interact with sensor units 110 via network 120, and in some embodiments, via server 115. In other embodiments, local computing device 145 and remote computing device 135 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

Control panel 130 may be a smart home system panel, for example, an interactive panel mounted on a wall in a user's home. Control panel 130 may be in direct communication via wired or wireless communication links 140 with the one or more sensor units 110, or may receive sensor data from the one or more sensor units 110 via local computing device 145 and network 120, or may receive data via remote computing device 135, server 115, and network 120.

The computing devices 135 and 145 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the computing devices 135, 145 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing device 145 may be operable to control operation of the output of the local computing device 145. The output may be a television, a liquid crystal display (LCD) monitor, a cathode ray tube (CRT) monitor, speaker, tactile output device, and/or the like. In some embodiments, the output may be an integral component of the local computing device 145. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 145 to the output.

The remote computing device 135 may be a computing entity operable to enable a remote user to monitor the output of the sensor units 110. The remote computing device 135 may be functionally and/or structurally similar to the local computing device 145 and may be operable to receive data streams from and/or send signals to at least one of the sensor units 110 via the network 120. The network 120 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 120 via communication links 140 and server 115.

In some embodiments, one or more sensor units 110 may communicate through wired and/or wireless communication links 140 with one or more of the computing devices 135 and 145, the control panel 130, and the network 120. The network 120 may communication through wired and/or wireless communication links 140 with the control panel 130, and the computing devices 135, 145 through server 115. In another embodiment, the network 120 may be integrated with any of the computing devices 135, 145 and/or server 115 such that separate components are not required. Additionally, in another embodiment, one or more sensor units 110 may be integrated with control panel 130, and/or control panel 130 may be integrated with local computing device 145 such that separate components are not required.

In some embodiments, the one or more sensor units 110 may be sensors configured to conduct periodic or ongoing automatic measurements related to determining the identity of an occupant, as well as determining the location of an occupant within a predetermined location. Each sensor unit 110 may be capable of sensing multiple identification and/or location determining parameters, or alternatively, separate sensor units 110 may monitor separate identification and/or location determining parameters. For example, one sensor unit 110 may determine the identity of an occupant, while another sensor unit 110 (or, in some embodiments, the same sensor unit 110) may detect the location of the occupant.

In some embodiments, a local computing device 145 may additionally monitor alternate location-determination parameters, such as using heartbeat, breathing, and/or audio sensors. In alternate embodiments, a user may input identification and location data directly at the local computing device 145 or control panel 130. For example, a user may enter identification data into a dedicated application on his smart phone or smart watch indicating that he is in the living room of his house. The identification and location data may be communicated to the remote computer device 135 accordingly. In addition, a GPS feature integrated with the dedicated application on the user's portable electronic device may communicate the user's location to the remote computer device 135.

In some embodiments, the one or more sensor units 110 may be separate from the control panel 130 and may be positioned at various locations throughout the home or property. In other embodiments, the one or more sensor units 110 may be integrated or collocated with other home or building automation system components, home appliances, or other building fixtures. For example, a sensor unit 110 may be integrated with a doorbell or door intercom system, or may be integrated with a front entrance light fixture. In other embodiments, a sensor unit 110 may be integrated with a wall outlet or switch. In still other embodiments, the one or more sensor units 110 may be integrated or collocated with the control panel 130 itself. In any embodiment, each of the one or more sensor units 110, control panel 130, and/or local computing device 145 may comprise a speaker unit, a microphone unit, and/or a camera unit.

In one embodiment, audio or video may be broadcast from the remote computing device 135 to the local computing device 145 and/or the control panel 130. The broadcast (whether it be audio or video) may be communicated directly to the local computing device 145 or the control panel 130 by way of network 120. In another embodiment, the broadcasts may be communicated first through server 115.

The server 115 may be configured to communicate with the one or more sensor units, local computing device 145, the remote computing device 135, and the control panel 130. The server 115 may perform additional processing on signals received from the one or more sensor units 110, local computing device 145, or control panel 130, or may forward the received information to the remote computing device 135. For example, server 115 may receive identification and location data from one or more sensor units 110 and may receive a communication request from remote computer device 135. Based on the received identification and location data, the server 115 may direct the received communication request to the appropriate component of the home automation system, such as the control panel 130 or local computing device 145. Thus, the home automation system, by way of communications with server 115, may automatically direct incoming audio and video streams from a remote caller to the appropriate microphone/speaker/video system in the home in order to enable one- or two-way communication with the occupants.

Server 115 may be a computing device operable to receive data streams (e.g., from sensor units 110 and/or local computing device 145, or remote computing device 135), store and/or process data, and/or transmit data and/or data summaries (e.g., to remote computing device 140). For example, server 115 may receive a stream of identification data from a sensor unit 110 and a stream of location data from the same or a different sensor unit 110. In some embodiments, server 115 may "pull" the data streams, e.g., by querying the sensor units 110, the local computing device 145, and/or the control panel 130. In some embodiments, the data streams may be "pushed" from the sensor units 110 and/or the local computing device 145 to the server 115. For example, the sensor units 110 and/or the local computing device 145 may be configured to transmit data as it is generated by or entered into that device. In some instances, the sensor units 110 and/or the local computing device 145 may periodically transmit data (e.g., as a block of data or as one or more data points).

The server 115 may include a database (e.g., in memory) containing location, identification and/or authentication data received from the sensor units 110 and/or the local computing device 145. Additionally, as described in further detail herein, software (e.g., stored in memory) may be executed on a processor of the server 115. Such software (executed on the processor) may be operable to cause the server 115 to monitor, process, summarize, present, and/or send a signal associated with resource usage data.

Figure 2:
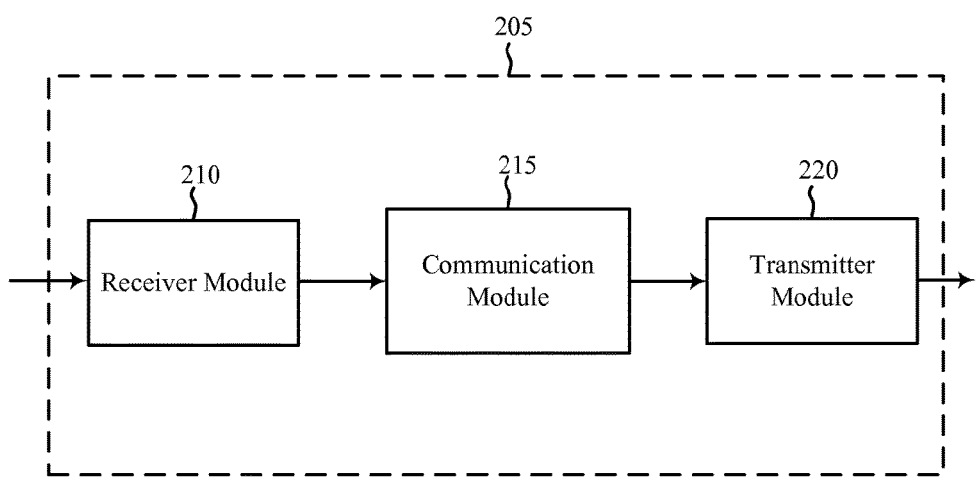
FIG. 2 shows a block diagram of a device relating to a security and/or an automation system, in accordance with various aspects of this disclosure.

FIG. 2 shows a block diagram 200 of a control panel 205 for use in electronic communication, in accordance with various aspects of this disclosure. The control panel 205 may be an example of one or more aspects of a control panel 130, or in other embodiments may be an example of one or more aspects of the one or more sensor units 110, or in still other embodiments may be an example of one or more aspects of the local computing device 145, each of which are described with reference to FIG. 1. The control panel 205 may include a receiver module 210, a communication module 215, and/or a transmitter module 220. The control panel 205 may also be or include a processor. Each of these modules may be in communication with each other—directly and/or indirectly.

As previously discussed, in one embodiment, where apparatus 205 is a control panel, apparatus 205 may be a control panel in the form of an interactive home automation system display. In another embodiment, apparatus 205 may be a local computing device such as a personal computer or portable electronic device (e.g., smart phone, smart watch, tablet computer). In yet another embodiment, apparatus 205 may be at least one sensor unit 110.

The components of the control panel 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive audio and/or video streams from the remote computing device 135, which may be a computing device operated by a remote third party caller. Received audio and/or video streams may be passed on to a communication module 215, which may project at the apparatus 205 audio and/or video streams received from the receiver module 210. In addition, the communication module 215 may detect audio, video, identification, location, and/or authentication at the apparatus 205, and may communicate the detected data on a transmitter module 220, and to other components of the apparatus 205. The transmitter module 220 may then communicate the data to the remote computing device 135, the control panel 130, or server 115.

In one embodiment, where the apparatus 205 is a control panel, the transmitter module 220 may communicate identification and location data to the remote computing device; for example, the transmitter may communicate that a child has entered the house, that the child is positively identified as being on the authenticated list, and may also communicate the location of the child within the house. If the operator of the remote computing device (e.g., a parent) wishes to communicate with the child and indicates such a desire on the remote computing device, the transmitter module 220 may then initiate an audio and/or video communication with the local computing device and/or control panel located in the room the child is currently determined to be present. In one embodiment, the communication may be enabled if the child answers or otherwise accepts the incoming communication transmission. In another embodiment, the communication may be automatically enabled regardless of whether the child chooses to answer or not.

Figure 3:
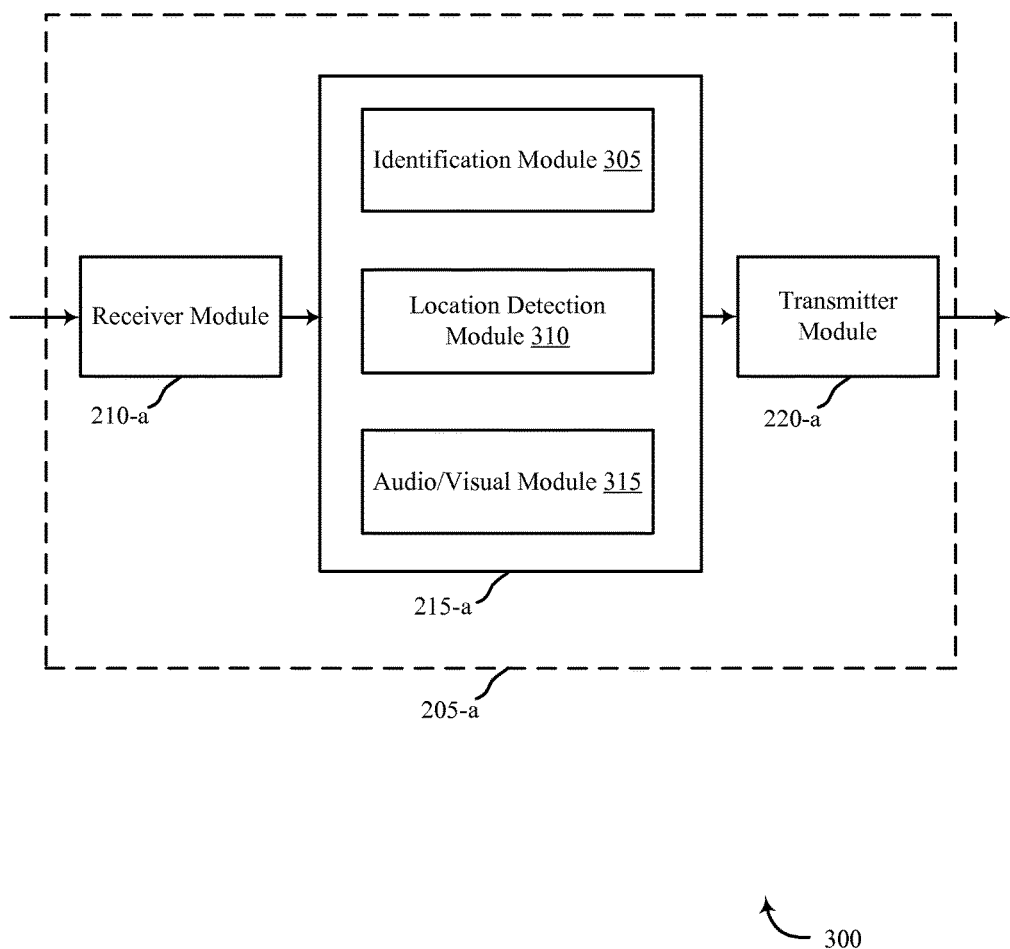
FIG. 3 shows a block diagram of a device relating to a security and/or an automation system, in accordance with various aspects of this disclosure.

Apparatus 205-$a$, which may be an example of apparatus 205 illustrated in FIG. 2, is further detailed in FIG. 3. Apparatus 205-$a$, may comprise any of a receiver module 210-$a$, a communication module 215-$a$, and/or a transmitter module 220-$a$, each of which may be examples of the receiver module 210, the communication module 215, and the transmitter module 220 as illustrated in FIG. 2. Apparatus 205-$a$ may further comprise, as a component of the communication module 215-$a$, any of an identification module 305, a location detection module 310, and an audio/visual projection module 315.

The components of apparatus 205-$a$ may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Where apparatus 205-$a$ is any of a sensor unit, control panel, or local computing device, receiver module 210-$a$ may be operable to receive audio and/or video broadcasts from the remote computing device. Such audio and/or video broadcasts may be in the form of real-time verbal and/or graphic (e.g., video or still image) communications or a transmission of a pre-recorded communication. In some embodiments, the pre-recorded communication may be created by the manufacturer (i.e., messages that are preprogrammed by the original equipment manufacturer). In other embodiments, a user may personally record a message that will be broadcast when certain conditions are met. The received audio and/or visual communication may then be transmitted to the audio/visual projection module 315 in the communication module 215-$a$. The audio/visual projection module may project the audio and/or video communication by way of one or more display device and/or speaker units integrated with the apparatus 205-$a$. In another embodiment, the audio and/or visual communication by be transmitted to a remote located display device and/or speaker unit.

In addition, the same apparatus 205-$a$ or a separate apparatus 205-$a$ may enable identification of a user at the apparatus 205-$a$ by way of the identification module 305. For example, apparatus 205-$a$ may be operable to determine the identification of a user by way of a biometric identification. The biometric identification may include determining the identity of a user by way of analyzing a fingerprint, a retinal pattern, a voice print, and/or a personal identification number (PIN) received at apparatus 205-$a$, which may be any of a sensor unit, control panel, or local computing device. In another embodiment, identification module 305 may identify the user by way of identifying the location of a user's portable electronic device through GPS. The identification data received by the identification module 305 may be communicated to transmitter module 220-$a$, which may communicate the data to the remote computing device.

In addition, the same apparatus 205-$a$, or a separate apparatus 205-$a$, may be operable to detect user location data at the apparatus 205-$a$ via location detection module 310. For example, the apparatus 205-$a$, may comprise a retinal scanner, a fingerprint scanner, a voiceprint sensor, a camera calibrated to identify facial structure, a GPS receiver or a input device (e.g. a keypad) into which a user may input a PIN or any other known identification detection means to detect the presence of a user and to determine the user's identity at or near the apparatus 205-$a$. In addition, identification module 305 may not only determine the identify of a user, but may also make a determine as to whether the user is authorized to be in certain locations or in the house at all. For example, it may be the case that a babysitter may be able to spend time in any of the rooms of a house except for the office, and thus the example parent at the remote computer system may receive an alert that there is an unauthorized user in an unauthorized location. In another example, a person may enter a PIN at an input device (e.g., a front door keypad), however, the identification module 305 may use biometric identification upon the person entering the house. It may be the case that the PIN and the biometric identification do not match, thus indicating an unauthorized entry.

The collected identification data may then be communicated from identification detection module 310 to transmitter module 220-$a$, which may transmit the identification data to the processor and/or to the remote computing device. As previously discussed, where identification data is transmitted via transmitter module 220-$a$ to a processor, the processor may accordingly broadcast audio and visual streams received from the remote computing device to the appropriate apparatus 205-*a* according to the received identification data. In addition or alternatively, identification data transmitted via transmitter module 220-*a* to the remote computing device may be presented to the operator of the remote computing device, such that the operator may selectively broadcast an audio and/or visual stream to the appropriate location based on the received identification data. In this way, the remote caller may reach home occupants immediately at the user's current location.

In some embodiments, identification and location data may be detected continuously at apparatus 205-*a* or at predetermined intervals. In other embodiments, identification and location data may be detected at apparatus 205-*a* at the instruction of the remote computing device or the home automation system. In some embodiments, the collected identification and location data may be communicated by way of transmitter module 220-*a* in real-time to the processor or remote computing device, while in other embodiments, the collected identification and/or location data may be time stamped and stored in memory integrated with the apparatus 205-*a*, stored in the network 120, and/or stored on the server 115 (as shown in FIG. 1).

Figure 4:
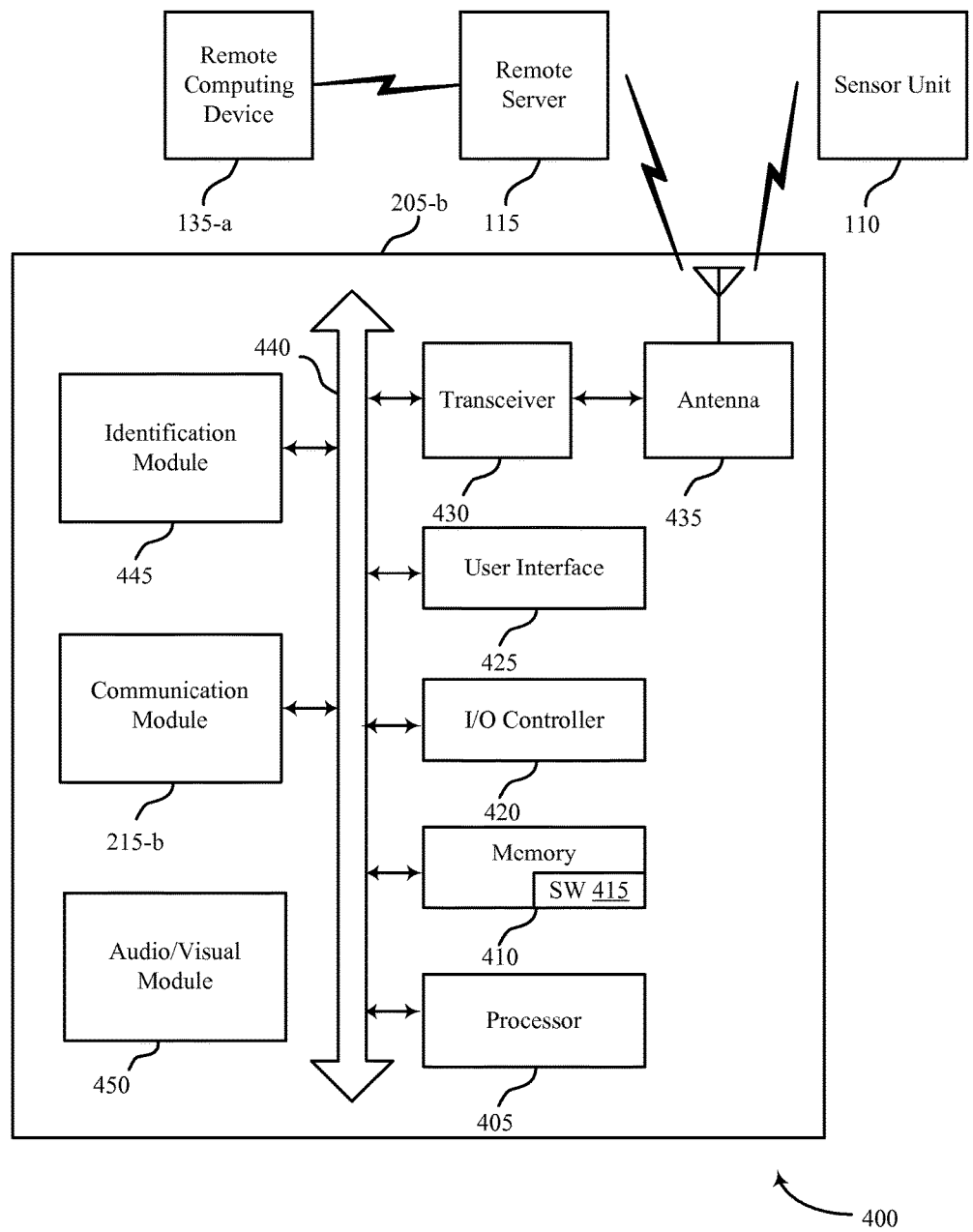
FIG. 4 shows a block diagram relating to a security and/or an automation system, in accordance with various aspects of this disclosure.

FIG. 4 shows a system 400 for use in establishing communication between a remote caller and the occupants of a home, in accordance with various examples. System 400 may include an apparatus 205-*b*, which may be an example of the control panel 130, local computing device 145, and/or one or more sensor units 110 of FIG. 1. Apparatus 205-*b* may also be an example of one or more aspects of apparatus 205 and/or 205-*a* of FIGS. 2 and 3.

Apparatus 205-*b* may include a communication module 215-*b*, which may be an example of the communication module 215, 215-*a* described with reference to FIGS. 2 and 3. The communication module 215-*b* may project audio and/or images, or may determine user identification, location, and/or authorization, or a combination thereof, as described above with reference to FIGS. 2-3.

Apparatus 205-*b* may also include components for bi-directional voice and data communications including components for transmitting communications and components for receiving communications. For example, apparatus 205-*b* may communicate bi-directionally with remote computing device 135-*a*, remote server 115-*a*, or sensor unit 110-*a*. This bi-directional communication may be direct (e.g., apparatus 205-*b* communicating directly with sensor unit 110-*a*) or indirect (e.g., apparatus 205-*b* communicating with remote computing device 135-*a* via remote server 115-*a*). Remote server 115-*a*, remote computing device 135-*a*, and sensor unit 110-*a* may be examples of remote server 115, remote computing device 135 and sensor unit 110 as shown with respect to FIG. 1.

In addition, apparatus 205-*b* may comprise identification module 445 and audio module 450. Identification module 445 may be the same as location detection module 310 from FIG. 3, or may be a separate and distinct location detection module. Identification module 445 may be operable to communicate the location of the apparatus 205-*b* to the remote computing device 135-*a* or remote server 115-*a*. Where apparatus 205-*b* may be any of a control panel, sensor unit, or local computing device, the plurality of apparatuses 205-*b* positioned throughout the home or property may communicate their respective location data via identification module 445 such that the remote computing device 135-*a* or remote server 115-*a* may be presented with, for example, a list or map of apparatuses 205-*b* throughout the home or property. Based on this received data, the remote caller may decide to, or the processor may automatically, selectively broadcast an audio and/or image (e.g., video) stream to one or more apparatuses 205-*b* based on their respective locations throughout the home as compared with identified occupant locations.

In addition, audio/visual module 450 may comprise a microphone, speaker, and/or camera. Thus, the remote computing device 135-*a* may be able to establish one- or two-way communication with one or more apparatuses 205-*b* throughout the home or property based, at least in part, on the location of each apparatus 205-*b*. Further, using identification and location data collected from communication module 215-*b*, the remote computing device 135-*a* may be able to establish one- or two-way communication with one or more apparatuses 205-*b* based, at least in part, on detected user identification and location.

In some embodiments, one- or two-way communication may be established based on data received from more than one apparatus 205-*b*. For example, a first apparatus, such as the apparatus 205-*b*, may collect and communicate audio/visual data by way of communication module 215-*b* to the remote computing device 135-*a*. However, the first apparatus 205-*b* may not have a speaker, microphone, and/or camera unit. Thus, one- or two-way communication may be established between the remote computing device 135-*a* and a second apparatus located near the first apparatus 205-*b* based on location information received from the identification module 445 in each of the first and second apparatuses. In this way, one- or two-way communication may be established with the remote computing device 135-*a* via the apparatus having a speaker, microphone, and/or camera unit that is located most closely to the detected audio and/or user identification and location data.

Apparatus 205-*b* may also include a processor module 405, and memory 410 (including software (SW) 415), an input/output controller module 420, a user interface module 425, a transceiver module 430, and one or more antennas 435, each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of remote server 115-*a* or sensor unit 110-*a*. The transceiver module 430 may include a modem to modulate the packets and provide the modulated packets to the one or more antennas 435 for transmission, and to demodulate packets received from the one or more antennas 435. While an apparatus comprising a sensor unit, local computing device, or control panel (e.g., 205-*b*) may include a single antenna 435, the apparatus may also have multiple antennas 435 capable of concurrently transmitting or receiving multiple wired and/or wireless transmissions. In some embodiments, one element of apparatus 205-*b* (e.g., one or more antennas 435, transceiver module 430, etc.) may provide a direct connection to a remote server 115-*a* via a direct network link to the Internet via a POP (point of presence). In some embodiments, one element of apparatus 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 435 and/or transceiver module 430 may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments each antenna 435 may receive signals or information specific and/or exclusive to itself. In other embodiments each antenna 435 may receive signals or information neither specific nor exclusive to itself.

In some embodiments, the user interface module 425 may include an audio device, such as an external speaker system, a visual device such as a camera or video camera, an external display device such as a display screen, and/or an input device (e.g., remote control device interfaced with the user interface module 425 directly and/or through I/O controller module 420).

One or more buses 440 may allow data communication between one or more elements of apparatus 205-b (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., detect identification and/or location data, broadcast audio communications from the remote computing device, etc.). Alternatively, the software/firmware code 415 may not be directly executable by the processor module 405 but may cause a computer (e.g., when compiled and executed) to perform functions described herein.

In some embodiments the processor module 405 may include, among other things, an intelligent hardware device (e.g., a central processing unit (CPU), a microcontroller, and/or an ASIC, etc.). The memory 410 may contain, among other things, the Basic Input-Output system (BIOS) which may control basic hardware and/or software operation such as the interaction with peripheral components or devices. For example, the communication module 215-b may be stored within the system memory 410. Applications resident with system 400 are generally stored on and accessed via a non-transitory computer readable medium, such as a hard disk drive or other storage medium. Additionally, applications may be in the form of electronic signals modulated in accordance with the application and data communication technology when accessed via a network interface (e.g., transceiver module 430, one or more antennas 435, etc.).

Many other devices and/or subsystems may be connected to, or may be included as, one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and is not discussed in detail in this disclosure. Code to implement the present disclosure may be stored in a non-transitory computer-readable medium such as one or more of system memory 410 or other memory. The operating system provided on I/O controller module 420 may be iOS®, ANDROID®, MS-dOS®, MS-WINDOWS®, OS/2®, UNIX®, LINUX®, or another known operating system.

The components of the apparatus 205-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 5:
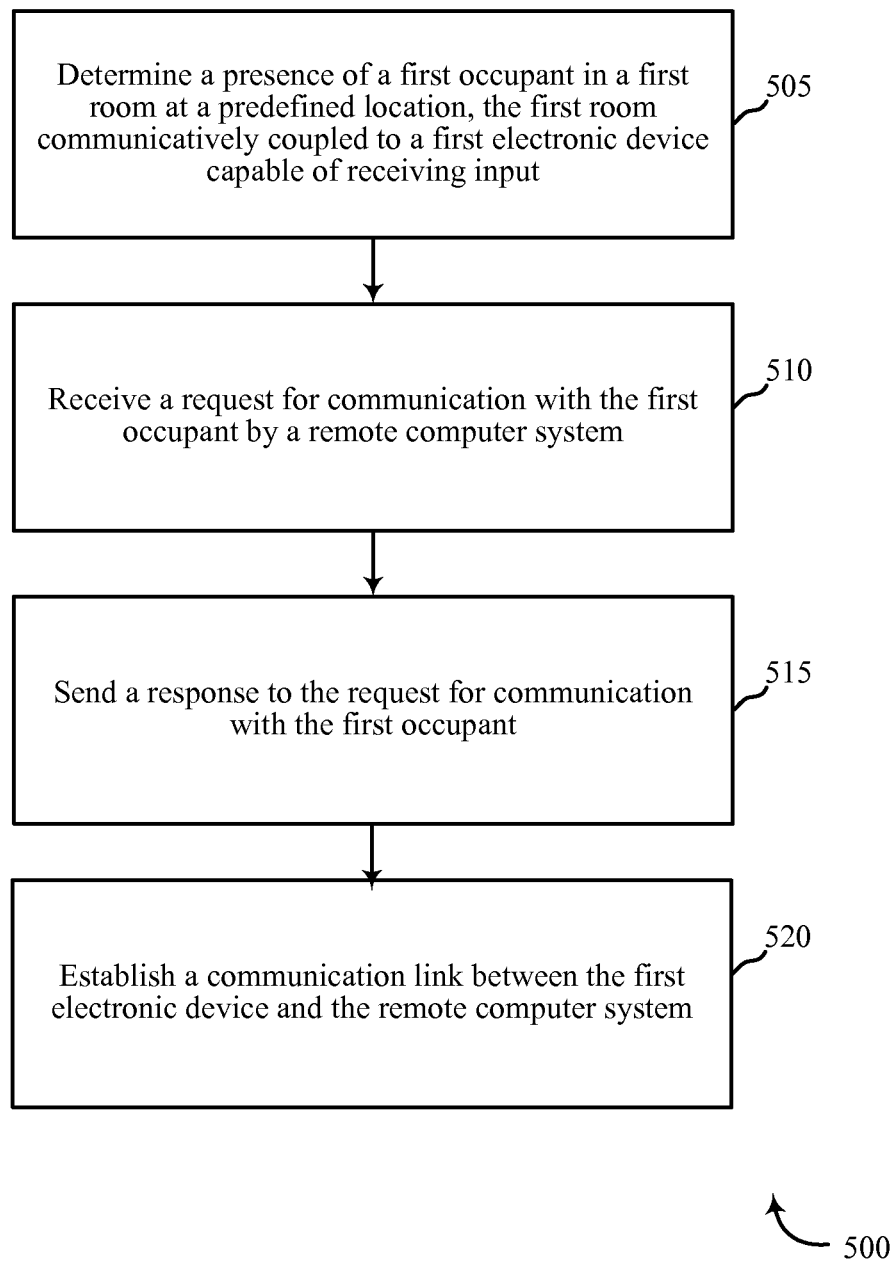
FIG. 5 shows a block diagram of an apparatus relating to a security and/or an automation system, in accordance with various aspects of this disclosure.

FIG. 5 is a flow chart illustrating an example of a method 500 for establishing communication between a remote third party and an occupant in a home. For clarity, the method 500 is described below with reference to aspects of one or more of the sensor units 110, local computing device 145, control panel 130, and/or remote computing device 135 as described with reference to FIGS. 1-4. In addition, method 500 is described below with reference to aspects of one or more of the apparatus 205, 205-a, or 205-b described with reference to FIG. 204. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 505, the method 500 may include determining a presence of a first occupant in a first room at a predefined location, the first room communicatively coupled to a first electronic device capable of receiving input. Determining the presence of an occupant may be determined by determining biometric information related with the occupant. Identification, and thus presence, may alternatively or in addition be manually inputted by a user at a local computing device such as a personal computer or smartphone, or into a control panel located within a room of the house. Determining presence may also be determined by the home automation system indicating that there is movement a room, or that an occupant's smartphone signal is being detected in another room. In some embodiments, detected identification and/or location data may be communicated to a remote computing device, such a remote computing device of a third party caller, where the identification and/or location data for the occupants may be displayed, for example, in the form of a list (text or image-based), or in the form of a floorplan of the home or property. Detected identification and/or location data may be continuously updated, or may be updated at predetermined intervals, or may alternatively be updated at the direction of the home automation system or remote computing device.

At block 510, the method 500 may include receiving a request for communication with the first occupant by a remote computer system. Thus, one- or two-way communication may be selectively established between a remote computing device (e.g. a parent away from home) and one or more electronic devices located in the home. In some embodiments, the one or more electronic devices may comprise a microphone, speaker, camera, and/or display device to enable communications.

The operations at blocks 505, 510, 515, and 520 may be performed using the receiver module 210, 210-*a*, the communication module 215, 215-*a*, 215-*b*, the transmitter module 220, 220-*a*, and/or the transceiver module 430, described with reference to FIGS. 2-4.

Thus, the method 500 may provide for communication methods relating to automation/security systems. It should be noted that the method 500 is just one implementation and that the operations of the method 500 may be rearranged or otherwise modified such that other implementations are possible.

Figure 6:
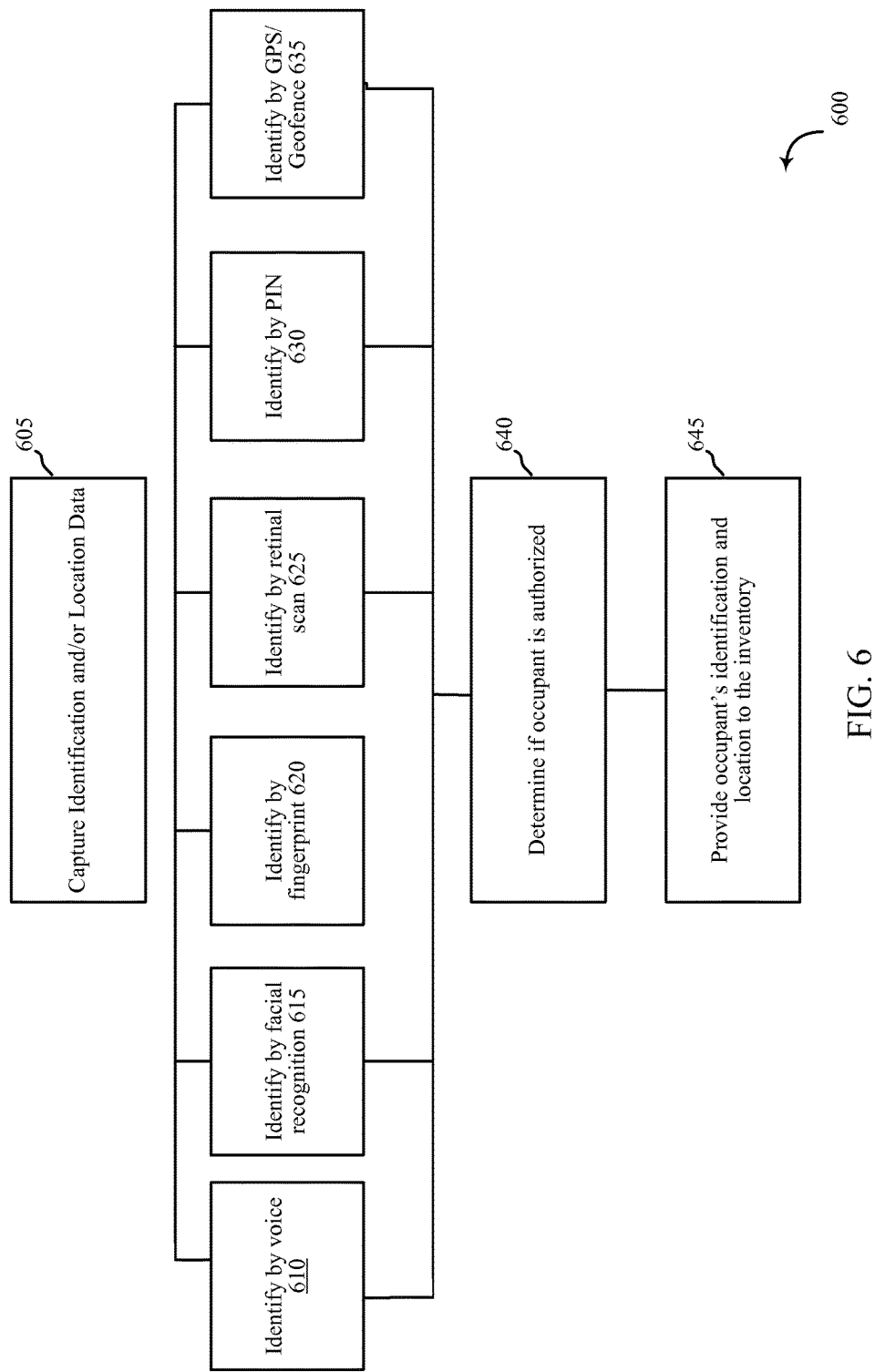
FIG. 6 shows a block diagram of an apparatus relating to a security and/or an automation system, in accordance with various aspects of this disclosure.
Figure 7:
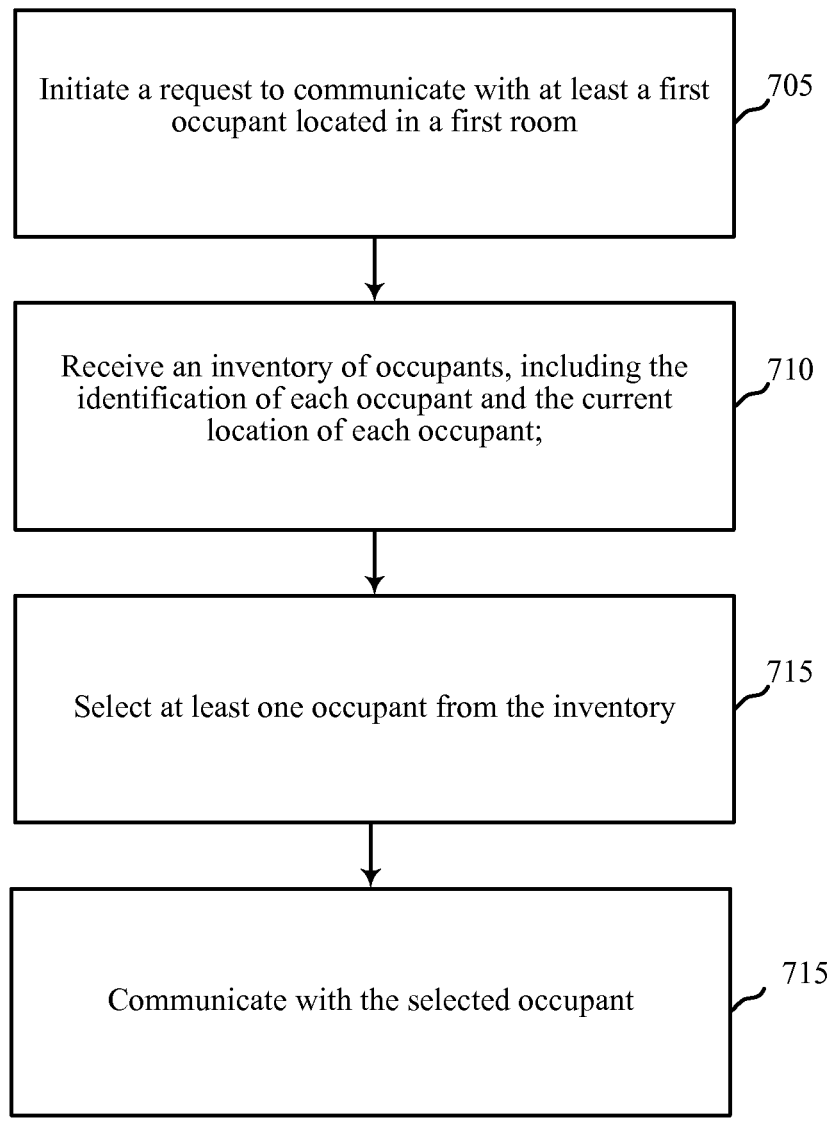
FIG. 7 is a flow chart illustrating an example of a method relating to a security and/or an automation system, in accordance with various aspects of this disclosure.

FIG. 6 is a flowchart illustrating an example of a method 600 for establishing communication between a remote computing device and an occupant in a home, in accordance with various aspects of the present disclosure. For clarity, the method 600 is described below with reference to aspects of one or more of the sensor units 110, local computing device 145, control panel 130, and/or remote computing device 135 described with reference to FIGS. 1-4, and/or aspects of one or more of the apparatus 205, 205-*a*, or 205-*b* described with reference to FIGS. 2-4. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 605, method 600 may include capturing identifying information of an occupant in a location (e.g., a house). As previously discussed, identification may be captured by at least one of a plurality of sensor units, control panels, or local computing devices, or a combination thereof, positioned throughout the home or carried by the occupant. In one embodiment, identifying the occupant and the occupant's location may be determined by capturing biometric information. In another embodiment, identifying the occupant and the occupant's location may be determined by other means such as receiving a signal from a portable electronic device known to be associated with the occupant, or by the occupant providing identification and location information by inputting such into a computing system.

At blocks 610, 615, 620, 625, 630, and 635, a plurality of identification means are provided. More specifically, at block 610, identification and/or location of the occupant may be determined by way of voice identification. The system may comprise a microphone which is enabled to capture audio from an occupant. At block 615, identification and/or location of the occupant may be determined by way of facial identification. The system may comprise an image capture device such as a camera or scanner, to capture features of the occupant's face. Similarly, at block 620 the occupant's fingerprint may be taken by way of a fingerprint scanner. In other cases, such as at block 625, a retinal scanner may scan the occupant's eye.

In addition to biometric capture, identification and location determinations may be made through other electronic means. For example, at block 630, the occupant may enter a PIN assigned to him into an input device, such as a keypad or a touch screen located within the home. In another embodiment, at block 635, the occupant may be associated with a personal portable electronic device such as a smartphone, smartwatch or tablet. Using communication means such as Bluetooth, near field communications, or geofencing, the occupant's identification and location may be determined through communication with the portable electronic device. The methods described in blocks 615, 620, and 625 may be performed concurrently, in series, or individually, or any combination thereof.

For each of the identification means, a previously determined database of authorized occupants may be provided for comparison. Thus, each occupant may have a profile stored in memory which comprises a voice print, fingerprints, a facial scan, a PIN, and an identifier related to a portable electronic device under the control of a specific occupant. At block 640, the captured identification and location data may be compared with stored data to determine whether the identified occupant is authorized.

At block 645, if the occupant is authorized, the occupant's identity and current location is added to the inventory. At block 650, if the occupant is determined to not be authorized, an alert may be sent to the remote computer system.

Thus, the method 600 may provide for targeted communication methods relating to automation/security systems. It should be noted that the method 600 is just one implementation and that the operations of the method 600 may be rearranged or otherwise modified such that other implementations are possible.

For clarity, the method 700 is described below with reference to aspects of one or more of the sensor units 110, local computing device 145, control panel 130, and/or remote computing device 135 described with reference to FIGS. 1-4, and/or aspects of one or more of the apparatus 205, 205-*a*, or 205-*b* described with reference to FIGS. 2-4. In some examples, a control panel, local computing device, and/or sensor unit may execute one or more sets of codes to control the functional elements described below. Additionally or alternatively, the control panel, local computing device, and/or sensor unit may perform one or more of the functions described below using special-purpose hardware.

At block 705, the method 700 may include an operator of the remote computer system initiates a request to communicate with an occupant in the home. In some embodiments, initiating a request may be by way of executing a software application on a personal computer or a portable electronic device. At block 710, in response to initiating a request, the operator of the remote computer system receives an inventory of occupants present in the home, including each occupants identity and location at the time of the request. In some embodiments, the inventory may be presented to the operator in the form of a list or a table, where the occupants are listed in text form. In other embodiments, the inventory may be image-based. In yet other embodiments, the inventory may be a combination of images and text, for example as a text-based table coupled with occupant avatars. In yet still other embodiments, the inventory may be presented in the form of a floorplan overlaid with indicators showing each occupant's identity and location.

At block 710, the operator of the remote computing device selects, from the inventory, which of the occupants with whom to communicate. In some embodiments, the operator may select the desired occupant by way of an input device (e.g., keypad, touch screen, mouse). In other embodiments, the operator may vocally request communication with a specific occupant through interacting with the software application.

At block 720, the operator of the remote computer system is connected with the requested occupant by way of a communication link between the remote computer system and a local computer system located in the room where the selected occupant is determined to be at the time of the communication request.

Thus, the method 700 may provide for targeted communication methods relating to automation systems. It should be noted that the method 700 is just one implementation and that the operations of the method 700 may be rearranged or otherwise modified such that other implementations are possible.

In some examples, aspects from two or more of the methods 500, 600, and 700 may be combined and/or separated. It should be noted that the methods 500, 600, and 700 are just example implementations, and that the operations of the methods 500, 600, and 700 may be rearranged or otherwise modified such that other implementations are possible.

Figure 8:
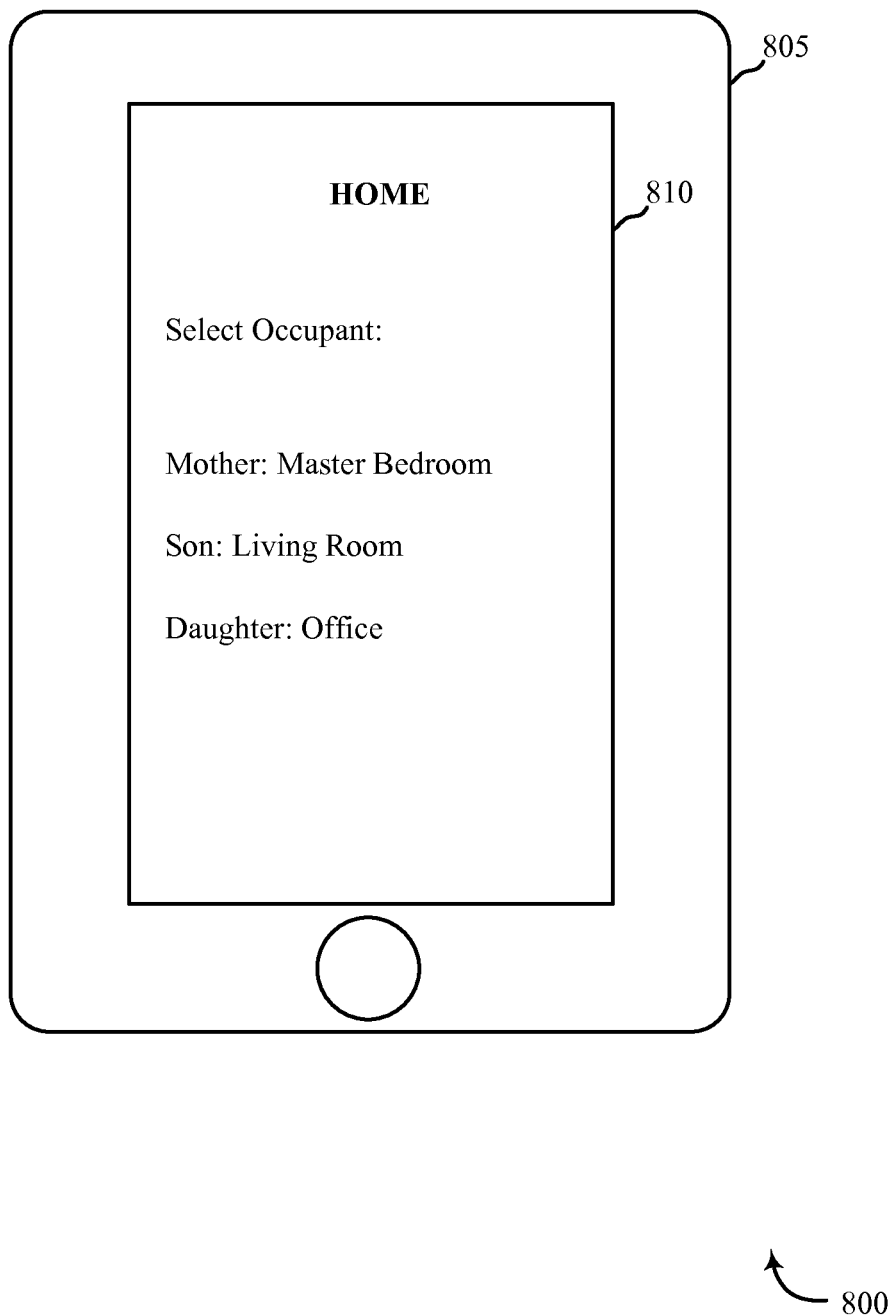
FIG. 8 shows a block diagram of an apparatus relating to a security and/or an automation system, in accordance with various aspects of this disclosure.

FIG. 8 shows a block diagram 800 of an apparatus 805 for use in establishing one- or two-way communications between a remote computer system and a home automation system, in accordance with various aspects of this disclosure. The apparatus may be an example of a remote computing device as illustrated in FIG. 1, such as a smartphone, smartwatch, tablet, or personal computer. Where apparatus 805 is a smartphone, smartwatch, or tablet, apparatus 805 may comprise a dedicated application operable to establish one- and two-way communications with the home automation system. Apparatus 805 may comprise a display screen 810, which may display information related to establishing communication with the home. In the illustrated example, identification and location data detected by one or more sensor units in the home may be communicated, for example via a network and server, to the apparatus 805. The detected identification and location data may be displayed on the display screen 810 of apparatus 805, such that the operator of the remote computer system (e.g., the father) may be notified of the location of occupants in the home. For example, in FIG. 8, the one or more sensor units have identified and located the following occupants: the mother is currently in the master bedroom, the daughter is in the living room, and the son is in the office.

Based on the received identification and location data, the father may select with which occupant he wishes to communicate, and the home automation system may automatically broadcast the received communication from the father to the speaker/video system(s) positioned closest to the intended recipients. In other embodiments, the father may select multiple occupants to receive the communication.

In one embodiment, identification and location data may be continuously updated on the display screen 810, for example as one occupant moves from the living room to the kitchen, such that the father may stay apprised of the locations of the intended recipients of his call.

In some embodiments, one or more sensor units, control panels, or local computing devices may receive a communication request from an outside caller, and may provide permission to receive the call. For example, a light may appear on a control panel or sensor unit, or a chime may sound, notifying the occupants of the home that an outside caller is attempting to initiate a one- or two-way communication with the occupants. In other embodiments, a message may appear on the display of a control panel or local computing device requesting confirmation that the communication may be initiated. The occupant(s) may accordingly accept or deny the incoming communication, such that privacy of the occupants is preserved.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. This disclosure may specifically apply to communication system application. In some embodiments, the concepts, the technical descriptions, the features, the methods, the ideas, and/or the descriptions may specifically apply to security and/or automation and/or communication system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and/or automation systems, comprising:
    determining a presence of a first occupant in a first room at a predefined location based at least in part on identification data received from a first sensor, the first room communicatively coupled to a first electronic device capable of receiving input;
    comparing the data received from the first sensor to identification data received from a second sensor;
    determining whether the first occupant is authorized to be at the predefined location based at least in part on the comparison;
    receiving a request for communication with the first occupant by a remote computer system;
    sending a response to the request for communication with the first occupant; and
    establishing a communications link between the first electronic device and the remote computer system based at least in part on determining whether the first occupant is authorized to be at the predefined location.

2. The method of claim 1, wherein receiving data from the first sensor or the second sensor comprises:
    capturing biometric information of the first occupant.

3. The method of claim 2, wherein capturing biometric information further comprises:
    identifying the first occupant through voice recognition.

4. The method of claim 2, wherein capturing biometric information further comprises:
    identifying the first occupant through facial recognition.

5. The method of claim 1, further comprising wherein, if the first occupant moves into a second room:
    determining, by a second electronic device capable of receiving input and located in the second room, the presence of the first occupant within the second room; and
    establishing communication, by the remote computer system, with the second electronic device based on determining the first occupant is located within the second room.

6. The method of claim 5 further comprising providing indications of location of the first and second occupants.

7. The method of claim 6 wherein providing indications of location further comprises providing the indications in text form on a display device coupled to the remote computer system.

8. The method of claim 7 wherein providing indications of location of the first and second occupants further comprises providing a first visual display of a first video feed of the first occupant and a second visual display of a second video feed of the second occupant on a display device coupled to the remote computer system.

9. The method of claim 1, further comprising:
determining a presence of a second occupant in a third room at the predefined location, the third room communicatively coupled to a third electronic device capable of receiving input; and
providing, to the remote computer system, an indication of location of both the first occupant and the second occupant.

10. The method of claim 9 wherein providing the indication of location is a visual display showing a visual indication of the first occupant in the first room and of the second occupant in the third room on a display device.

11. The method of claim 9 wherein providing the indication of location is a list describing the presence of the first occupant and the second occupant.

12. The method of claim 1 wherein determining the presence of the first occupant further comprises:
receiving, by the first electronic device, a personal identification number (PIN) associated with the first occupant.

13. The method of claim 12 further comprising:
capturing biometric information of the first occupant; and
determining whether the first occupant is authorized by way of comparing the PIN with the biometric information to identify a match.

14. The method of claim 13 further comprising:
sending an alert to the remote computer system if the occupant associated with the PIN does not match the captured biometric information of the occupant.

15. The method of claim 1, further comprising:
detecting a pre-determined condition associated with the first room; and
transmitting a pre-recorded message to the first electronic device based at least in part on determining whether the first occupant is authorized and on detecting the pre-determined condition.

16. An apparatus for an automation system comprising:
a processor;
memory in electronic communication with the processor;
a wireless communication interface coupled to the processor;
instructions stored in the memory, the instructions being executable by the processor to:
determine a presence of a first occupant in a first room at a predefined location based at least in part on identification data received from a first sensor, the first room communicatively coupled to a first electronic device capable of receiving input;
compare the identification data received from the first sensor to identification data received from a second sensor;
determine whether the first occupant is authorized to be at the predefined location based at least in part on the comparison;
receive a request for communication with the first occupant by a remote computer system;
send a response to the request for communication with the first occupant; and
establish a communications link between the first electronic device and the remote computer system based at least in part on determining whether the first occupant is authorized to be at the predefined location.

17. The apparatus of claim 16 wherein when the processor receives identification data from the first sensor or the second sensor, the instructions further cause the processor to:
capture biometric information of the first occupant.

18. The apparatus of claim 16 further comprising:
a fingerprint sensor;
wherein the instructions further cause the processor to identify the first occupant by identifying a fingerprint associated with the first occupant taken at the fingerprint sensor.

19. The apparatus of claim 16 further comprising:
a microphone;
identify the first occupant by identifying a voice print of the first occupant received by the microphone.

20. A non-transitory computer-readable medium storing computer-executable code for an automation system, the code executable by a processor to:
determine a presence of a first occupant in a first room at a predefined location based at least in part on identification data received from the first sensor, the first room communicatively coupled to a first electronic device capable of receiving input;
compare the identification data received from a first sensor to identification data received from a second sensor;
determine whether the first occupant is authorized to be at the predefined location based at least in part on the comparison;
receive a request for communication with the first occupant by a remote computer system;
send a response to the request for communication with the first occupant; and
establish a communications link between the first electronic device and the remote computer system based at least in part on determining whether the first occupant is authorized to be at the predefined location.

* * * * *